United States Patent [19]
Lukins et al.

[11] Patent Number: 5,821,502
[45] Date of Patent: Oct. 13, 1998

[54] SYSTEM FOR PROVIDING IN-SITU TEMPERATURE MONITORING AND TEMPERATURE CONTROL OF A SPECIMEN BEING EXPOSED TO PLASMA ENVIRONMENTS

[75] Inventors: Ronald E. Lukins, Whittier; Martin P. Cooksey, Long Beach, both of Calif.

[73] Assignee: Boeing North American, Inc., Seal Beach, Calif.

[21] Appl. No.: 673,526

[22] Filed: Jul. 1, 1996

[51] Int. Cl.[6] .............................. B23K 10/00; H05B 1/02
[52] U.S. Cl. .............. 219/496; 219/121.43; 219/121.41; 356/316; 356/244
[58] Field of Search ........................ 219/121.41, 121.44, 219/121.43, 121.48, 496, 497, 494; 356/311–316, 244; 156/345; 315/111.21, 111.51, 111.31

[56] References Cited

U.S. PATENT DOCUMENTS

| | | | |
|---|---|---|---|
| 3,871,768 | 3/1975 | Belcher et al. | 356/87 |
| 4,482,246 | 11/1984 | Meyer et al. | 356/316 |
| 4,493,745 | 1/1985 | Chen et al. | 156/626 |
| 4,925,306 | 5/1990 | Sacks et al. | 356/311 |
| 4,951,602 | 8/1990 | Kanai | 118/719 |
| 5,081,397 | 1/1992 | Liang et al. | 315/111.21 |
| 5,122,713 | 6/1992 | Liang et al. | 315/111.21 |
| 5,235,401 | 8/1993 | Cilia et al. | 356/311 |
| 5,347,460 | 9/1994 | Gifford et al. | 364/468 |
| 5,408,494 | 4/1995 | Schlienger | 373/20 |
| 5,413,954 | 5/1995 | Aydil et al. | 437/81 |
| 5,446,538 | 8/1995 | Noll | 356/318 |
| 5,489,362 | 2/1996 | Steinhardt et al. | 156/643.1 |
| 5,671,045 | 9/1997 | Woskov et al. | 356/316 |

*Primary Examiner*—Mark H. Paschall
*Attorney, Agent, or Firm*—Lawrence N. Ginsberg; Charles T. Silberberg

[57] ABSTRACT

A housing provides temperature monitoring and temperature control of a specimen, while the specimen is being exposed to plasma environments for in-situ reactivity studies or other plasma processing purposes. The housing is adaptable for use with a temperature controller and a pressure measurement device. The housing includes a temperature monitoring mechanism and temperature control connections. The temperature monitoring mechanism provides in-situ specimen temperature indications. It includes a first enclosure having a specimen supporting portion on an exterior surface thereof. A fluid conduit has a first end in fluid communication with an interior portion of the first closure. A second enclosure has an interior portion thereof in fluid communication with a second end of the fluid conduit. The second enclosure includes the ability for attachment to a pressure measurement device. Temperature indications of a test specimen positioned on the specimen supporting portion are correlated with pressures in the first and second enclosures. The correlations provide commensurate indications of pressure to the pressure measurement device to provide the in-situ specimen temperature indications. The temperature control connections allow use with a temperature controller for providing a desired temperature of the specimen supporting portion.

16 Claims, 2 Drawing Sheets

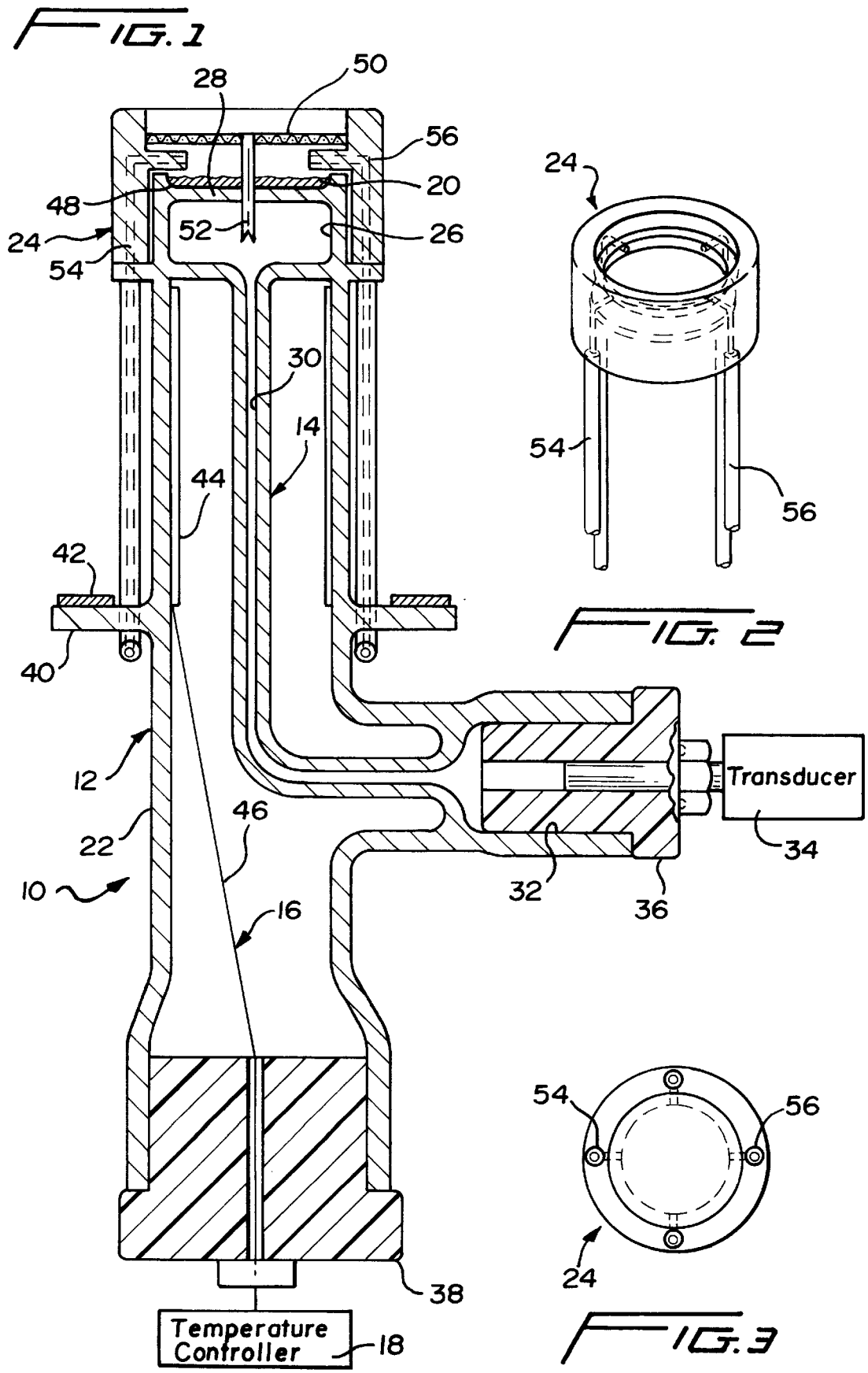

SYSTEM FOR PROVIDING IN-SITU TEMPERATURE MONITORING AND TEMPERATURE CONTROL OF A SPECIMEN BEING EXPOSED TO PLASMA ENVIRONMENTS

BACKGROUND OF THE INVENTION

1. Field of the Invention

The present invention relates to plasma processing, and more particularly to a system for controlled material exposures.

2. Description of the Related Art

Independent control of the distribution of charged particles and neutral particles generated in plasma systems is difficult and often impossible. The coupling of system operating parameters (pressure, power, and gas inlet flow rate) and geometrical factors with microscopic parameters, which ultimately and more directly influence material processing is complicated.

For example, U.S. Pat. No. 5,446,538, issued to R. Noll, discloses a process and device for emission spectroscopy, particularly for laser emission spectroscopy, wherein the radiation emitted by the laser-induced plasma of the workpiece to be analyzed is decomposed by a spectrometer and at least one fraction of the found spectrum is transferred to a processing unit. To provide the analysis, the laser-induced emissions are analyzed with a complicated analytical and experimental spectrometer system.

U.S. Pat. No. 4,493,745, issued to L. Chen et al. disclose a method for etching a batch of semiconductor wafers to end point using optical emission spectroscopy. In a preferred embodiment, a computer simulation is performed using an algorithm describing the concentration of the monitored etch species within the etching chamber as a function of time.

U.S. Pat. No. 3,871,768, issued to R. Belcher et al. discloses another system for analyzing a sample of matter by emission spectroscopy. The apparatus includes an emission promoting structure defining a sheltered region whereby a reactant vapor can be retained within the region while being exposed to flame gas, and at the same time, optical analysis of the interacting gases in the sheltered region is permitted.

Both the '745 and the '768 patents involve rather complicated analysis means to analyze plasma emissions.

OBJECTS AND SUMMARY OF THE INVENTION

It is, therefore, a principal object of the present invention to provide inexpensive, efficient temperature monitoring and temperature control of a test specimen being exposed to a plasma environment.

It is another object to provide other diagnostic means adjacent to such a test specimen.

These and other objects are achieved by the present invention, which, in a broad aspect, comprises a housing for providing temperature monitoring and temperature control of a specimen, while the specimen is being exposed to plasma environments for in-situ reactivity studies or other plasma processing purposes. The housing is adaptable for use with a temperature controller and a pressure measurement device.

The housing includes temperature monitoring means and temperature control connection means. The temperature monitoring means provides in-situ specimen temperature indications. It includes a first enclosure having a specimen supporting portion on an exterior surface thereof. A fluid conduit has a first end in fluid communication with an interior portion of the first closure. A second enclosure has an interior portion thereof in fluid communication with a second end of the fluid conduit. The second enclosure includes means for attachment to a pressure measurement device. Temperature indications of a test specimen positioned on the specimen supporting portion are correlated with pressures in the first and second enclosures. The correlations provide commensurate indications of pressure to the pressure measurement device to provide the in-situ specimen temperature indications. The temperature control connection means provides connection to a temperature controller for providing a desired temperature of the specimen supporting portion.

By combining features of specimen support and temperature monitoring/control in a single, simple housing efficient controlled plasma exposure testing can be achieved.

The housing preferably includes means for providing diagnostic instrumentation adjacent to the specimen. Inexpensive diagnostics can be used to measure various physical and chemical parameters during control testing. This provides some degree of control and measurement of microscopic parameters with reactivity. Measurements of these microscopic parameters very near the surface of the material to be processed permits a determination of material reactivity and other material related changes and a determination of the environmental parameters, which lead to such changes. In this way, parametric studies can be performed and quantities such as reaction efficiency, and in some cases, reaction probabilities and/or reaction cross-sections can be experimentally determined.

In addition to providing temperature control, the invention preferably includes specimen electrical biasing and shielding and diagnostics for radiation monitoring and system temperature measurement. A fiber optic cable may be used to transmit the radiation collected by the cable near the specimen holder to a radiometer for measurements, and an inlet gas feed line allowing for gas extraction and insertion just in front of the specimen surface. Teflon plugs allow a stable and inexpensive means for the attachment of a pressure measurement device (i.e. transducer) and for feedthrough for tape heater electrical lines.

Other objects, advantages and novel features of the present invention will become apparent from the following detailed description of the invention when considered in conjunction with the accompanying drawings.

BRIEF DESCRIPTION OF THE DRAWINGS

FIG. 1 is a cross-sectional view of the system of the present invention.

FIG. 2 is a perspective view of the cap, which fits upon the housing of the present invention, the cap providing access for diagnostic instrumentation.

FIG. 3 is a bottom view of the cap illustrated in FIG. 2.

DETAILED DESCRIPTION OF THE PREFERRED EMBODIMENT

Figure 4:
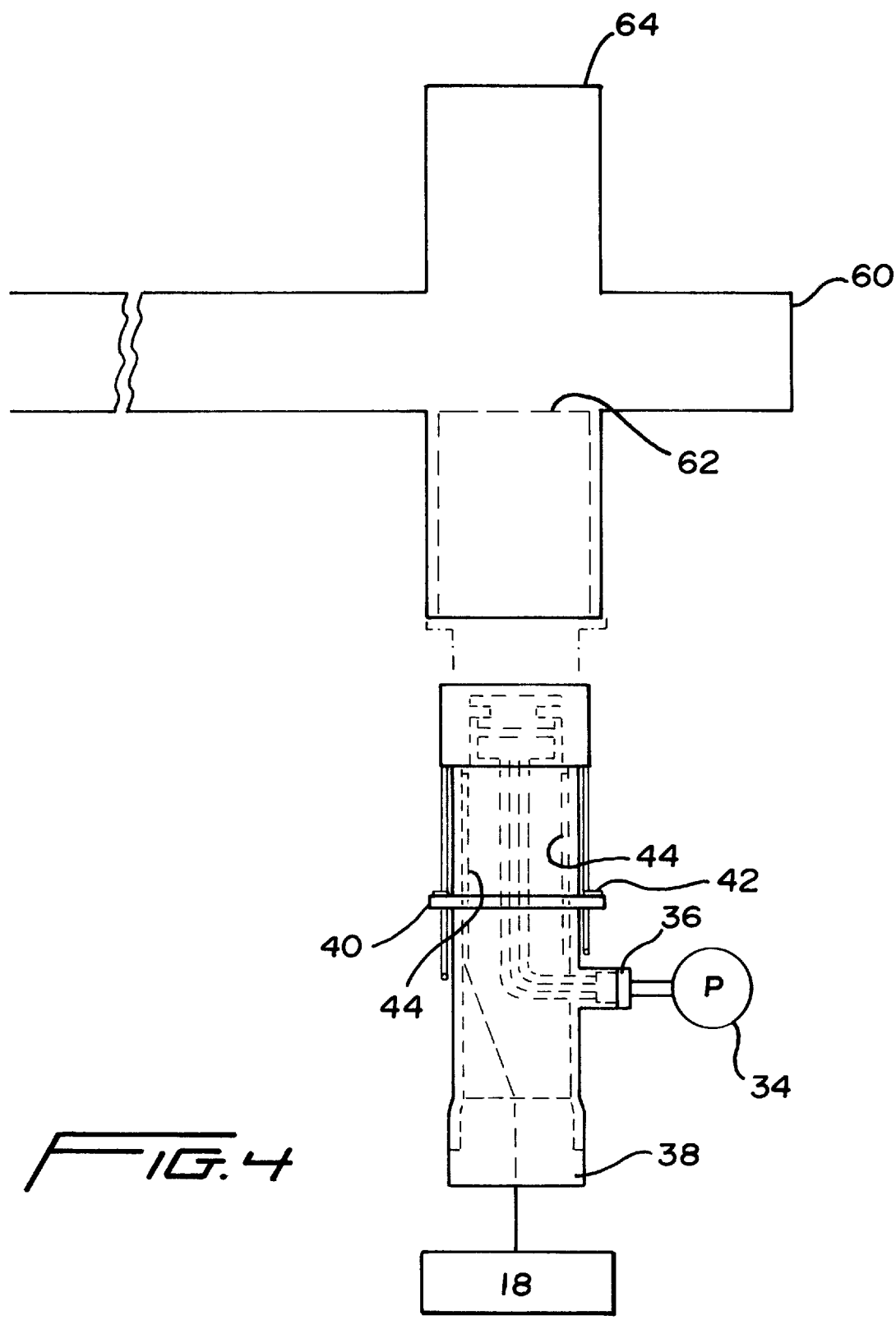
FIG. 4 is a schematic illustration showing utilization of the system of the present invention relative to a plasma chamber.

Referring now to the drawings and the characters of reference marked thereon, FIG. 1 illustrates the system of the present invention, designated generally as 10. The system 10 includes an electrically non-conductive housing, designated generally as 12. The housing 12 includes temperature monitoring means 14 and temperature control connection means 16, as will be discussed in detail below.

The temperature monitoring means 14 provides in-situ specimen temperature indications. The temperature control connection means 16 provides connection to a temperature controller 18 for providing a desired temperature of the specimen 20.

The housing 12 includes a main portion 22 and a cap 24. The main portion includes a first enclosure 26. A specimen supporting portion 28 is formed on an exterior surface of the first enclosure 26. The main portion 22 also includes a fluid conduit 30, having a first end in fluid communication with an interior portion of the first enclosure 26. A second enclosure 32 has an interior portion thereof in fluid communication with a second end of the fluid conduit 30. The second enclosure 32 includes means for attachment to a pressure measurement device such as a transducer 34. The transducer 34 may be attached via a Teflon™ plug 36. Similarly, a Teflon™ plug 38 may be used at the end of the main portion 22, which provides access to the temperature controller 18.

The main portion 22 also includes an outwardly extending flange 40 having a seal, preferably an RTV adhesive seal 42. As will be described below, the flange 40 and seal 42 provide desired positioning of the housing 12 in a plasma chamber.

The temperature control connection means 16 preferably comprises a tape heater 44, which attaches to an inner surface of the main portion 22. A wire 46 is attached at one end to the tape heater 44 and is fed through the Teflon™ plug 38 to the temperature controller 18. A conventional tape heater 44 may be utilized. Similarly, the temperature controller 18 may be of the conventional type, such as that manufactured by Omega Engineering Co. and Varian Corporation.

The housing 12 is formed of an electrically non-conductive material, preferably glass. This provides effective thermal conductivity. Therefore, heating of the wall by the tape heater results in a commensurate heating of the specimen supporting portion 28. The use of glass, also minimizes RF interference with the tape heater 44 and the pressure measurement device 34.

As can be seen by reference to FIGS. 2 and 3, as well as FIG. 1, the housing 12 preferably includes the cap 24 for providing diagnostic instrumentation to the housing for accessing a portion of the housing adjacent to, and in fluid communication with, a third enclosure 48, which contains the specimen 20. The third enclosure 48 is, in part, formed by the specimen supporting portion 28. A biasing grid 50 is positionable relative to the cap 24 so as to form a portion of the enclosure 48. The biasing grid 50 alters the electromagnetic fields and charged particle distribution adjacent to the specimen 20. The biasing grid 50 may be formed of, for example, wire mesh. An electrical connection 52 provides connection to a biasing power supply (not shown). When connected to such a power supply, the voltage on the biasing grid 50 is controlled. When connection 52 is electrically grounded, the grid 50 acts as a Faraday shield. The cap 24 preferably includes a plurality of conduits 54, 56. The conduits 54, 56 are provided within the cap 24 to provide access to sensors for diagnostic instrumentation (not shown). For example, fiber optic cables may be fed through these conduits.

Referring now to FIG. 4, during operation of the system 10 of the present invention, the housing 12 is moved so that it's forward end is positioned inside of a plasma chamber 60, as shown by phantom lines 62.

Prior to controlled material exposures for test purposes, using the plasma chamber 60, an independent means for measuring the surface temperature of the specimen, such as a thermocouple (not shown), is incorporated through a port 64 into the plasma chamber. The pressure in the plasma chamber 60 is preset at desired pressure levels using a vacuum pump (not shown). Typical pressure levels may be, for example, from 0.05 torr to about 100 torr.

The housing 12, supporting portion 28, and the specimen 20 temperatures are all controlled applying steady state power from the temperature controller 18 to the tape heater 44. Once steady state temperatures are realized, the specimen temperature is correlated with the pressure gage 34 reading. The above procedure is repeated by changing the temperature controller set points, allowing the system to attain a new thermal steady state condition, and correlating specimen temperature to the pressure gage 34 reading. Analytical means can be used to determine a mathematical relationship between specimen temperature and pressure gage readings, for future use.

Removing the specimen temperature measurement means, the pressure gage 34 readings, alone, now provide a suitable specimen temperature indicator through the above correlations. Diagnostic cables, sensors, and gas feeds can be placed through the feed-throughs 54, 56, as desired. The system is now ready for controlled plasma exposure testing.

The present system simultaneously controls and monitors specimen temperature and exposure environment parameters adjacent to the test specimen. The specimen, specimen supporting portion of the enclosure, and the remaining walls of the first enclosure 26 comprise a bulb-type thermometer similar to a common glass bulb-type thermometer. This permits accurate in-situ specimen temperature measurements through the correlations described above.

Furthermore, correlation of the controlled in-situ specimen temperatures and exposure parameters adjacent to the specimen provide the means to determine material/exposure reactivity, which is nearly independent of the plasma system, which generates the exposure environment. Such exposure parameters include vacuum pressure, electromagnetic radiation, reactive neutral gas species partial pressure, charged particle concentrations and byproduct species partial pressures. Through modeling efforts this material/exposure reactivity can be used for system design and other scaleup applications.

Example:

A plasma chamber was utilized, which provided an environment adjacent to the specimen comprising, exclusively, molecular oxygen and neutral atomic oxygen. A few different types of specimens were used. These specimens comprised a metal disk by itself, a metal disk with a hydrocarbon oil film on its surface, a metal disk with a painted surface thereon, and a metal disk with a thin polymer surface thereon.

The following diagnostics adjacent to the specimen were used: (1) total pressure and (2) atomic oxygen flux diagnostics. Reaction efficiency, RE(T) can be experimentally determined as function of temperature by using the following relationship:

$$RE(T) = R/\rho A \phi$$

R = mass loss rate (mg/min)
$\rho$ = mass density (mg/cm$^3$)
A = mass exposure area (cm$^2$)
$\phi$ = atomic oxygen flux (atoms/cm$_2$.sec)

T=temperature
where at a preset specimen temperature
ρ=either the oil, paint or polymer density,
A=surface area of the specimen,
φ=measured atomic oxygen flux,
R=oil, paint or polymer mass loss rate.

(R can be determined by determined mass loss before and after material exposures for preset varied time exposures.)

The reaction efficiency, as determined above, is nearly or completely independent of the system.

For material temperatures between room temperature and 300° F., atomic oxygen flux values between 1 and $100 \times 10^{22}$ atoms/centimeters$_2$ .sec, the typical loss rates for oils is 1–100 mg/hr. For paints and polymers, mass loss rates, are between 1 and 100 mg/min.

Obviously, many modifications and variations of the present invention are possible in light of the above teachings. It is therefore to be understood that, within the scope of the appended claims, the invention may be practiced otherwise than as specifically described. What is claimed and desired to be secured by Letters Patent of the United States is:

Claims:

1. A housing for providing temperature monitoring and temperature control of a specimen, while the specimen is being exposed to plasma environments for in-situ reactivity studies or other plasma processing purposes, said housing being adaptable for use with a temperature controller and a pressure measurement device, said housing comprising:
   a) temperature monitoring means for providing in-situ specimen temperature indications, said temperature monitoring means comprising:
      i) a first enclosure having a specimen supporting portion on an exterior surface thereof;
      ii) a fluid conduit having a first end in fluid communication with an interior portion of said first enclosure; and
      iii) a second enclosure having an interior portion thereof in fluid communication with a second end of said fluid conduit, said second enclosure including means for attachment to a pressure measurement device;
   wherein temperature indications of a test specimen positioned on said specimen supporting portion are correlated with pressures in said first and second enclosures based upon mathematical relationships therebetween, said correlations providing commensurate indications of pressure to said pressure measurement device to provide said in-situ specimen temperature indications; and
   b) temperature control connection means for providing connection to a temperature controller for providing a desired temperature of said specimen supporting portion.

2. The apparatus of claim 1, further comprising:
   means for providing diagnostic instrumentation to said housing for accessing a portion of said housing adjacent to, and in fluid communication with, a third enclosure containing said specimen.

3. The apparatus of claim 1, wherein said housing comprises:
   a main portion including said first enclosure, said fluid conduit, and said second enclosure, said main portion further including an outwardly extending flange having a seal thereon, said flange for providing desired positioning of said third enclosure in a plasma chamber.

4. The apparatus of claim 3, wherein said housing further comprises:
   a cap connectable to said main portion including means for providing diagnostic instrumentation to said housing for accessing a portion of said housing adjacent to and in fluid communication with a third enclosure containing said specimen.

5. The apparatus of claim 4, further including a biasing grid positionable relative to said cap, so as to form a portion of said third enclosure, said biasing grid for altering the electromagnetic fields and charged particle distribution adjacent to the specimen.

6. The apparatus of claim 3, wherein said means for providing diagnostic instrumentation comprises a plurality of conduits extending through said cap for providing access to sensors.

7. A system for providing temperature monitoring and temperature control of a specimen, while the specimen is being exposed to plasma environments for in-situ reactivity studies or other plasma processing purposes, comprising:
   a) a housing, comprising:
      i) temperature monitoring means for providing in-situ specimen temperature indications, said temperature monitoring means comprising:
         a first enclosure having a specimen supporting portion on an exterior surface thereof;
         a fluid conduit having a first end in fluid communication with an interior portion of said first enclosure; and
         a second enclosure having an interior portion thereof in fluid communication with a second end of said fluid conduit, said second enclosure including means for attachment to a pressure measurement device;
      wherein temperature indications of a test specimen positioned on said specimen supporting portion are correlated with pressures in said first and second enclosures based upon mathematical relationships therebetween, said correlations providing commensurate indications of pressure to said pressure measurement device to provide said in-situ specimen temperature indications; and
      ii) temperature control connection means for providing connection to a temperature controller for providing a desired temperature of said specimen supporting portion;
   b) a pressure measurement device attached to said second enclosure; and
   c) a temperature controller attached to said temperature control connection means.

8. The apparatus of claim 7 further comprising:
   means for providing diagnostic instrumentation to said housing for accessing a portion of said housing adjacent to, and in fluid communication with, a third enclosure containing said specimen.

9. The apparatus of claim 7, wherein said housing comprises:
   a main portion including said first enclosure, said fluid conduit, and said second enclosure, said main portion further including an outwardly extending flange having a seal thereon, said flange for providing desired positioning of said third enclosure in a plasma chamber.

10. The apparatus of claim 9, wherein said housing further comprises:
    a cap connectable to said main portion including means for providing diagnostic instrumentation to said housing for accessing a portion of said housing adjacent to and in fluid communication with a third enclosure containing said specimen.

11. The apparatus of claim 10, further including a biasing grid positionable relative to said cap, so as to form a portion of said third enclosure, said biasing grid for altering the electromagnetic fields and charged particle distribution adjacent to the specimen.

12. The apparatus of claim 9, wherein said means for providing diagnostic instrumentation comprises a plurality of conduits extending through said cap for providing access to sensors.

13. The system of claim 7, further comprising:
diagnostic instrumentation; and
means for providing said diagnostic instrumentation to said housing for accessing a portion of said housing adjacent to, and in fluid communication with, a third enclosure containing said specimen.

14. The system of claim 13, wherein said diagnostic instrumentation comprises an additional pressure measurement device.

15. The apparatus of claim 13, wherein said diagnostic instrumentation comprises means for measuring electromagnetic radiation.

16. The system of claim 13, wherein said diagnostic instrumentation comprises means for extracting and providing gases to and from said third enclosure.

\* \* \* \* \*